United States Patent
Cruise et al.

(10) Patent No.: US 9,331,365 B2
(45) Date of Patent: *May 3, 2016

(54) SHARED CONTROL OF THERMISTOR AND DUAL PURPOSE THERMISTOR LINE

(75) Inventors: Nathan Cruise, Phoenix, MD (US); Tarek Aydin, Edgewood, MD (US); Steven J. Phillips, Ellicott City, MD (US)

(73) Assignee: BLACK & DECKER INC., New Britain, CT (US)

( * ) Notice: Subject to any disclaimer, the term of this patent is extended or adjusted under 35 U.S.C. 154(b) by 729 days.

This patent is subject to a terminal disclaimer.

(21) Appl. No.: 13/554,197

(22) Filed: Jul. 20, 2012

(65) Prior Publication Data

US 2012/0286732 A1    Nov. 15, 2012

Related U.S. Application Data

(63) Continuation of application No. 12/246,844, filed on Oct. 7, 2008, now Pat. No. 8,269,458.

(51) Int. Cl.
| | |
|---|---|
| H02J 7/00 | (2006.01) |
| H01M 10/48 | (2006.01) |
| H01M 10/42 | (2006.01) |
| H01M 10/44 | (2006.01) |

(52) U.S. Cl.
CPC .......... *H01M 10/486* (2013.01); *H01M 10/425* (2013.01); *H01M 10/443* (2013.01); *H02J 7/0031* (2013.01)

(58) Field of Classification Search
CPC ............ H02J 7/0031; H02J 2007/0098; H02J 7/0004; H02J 7/0091; H01M 10/443; H01M 10/486; H01M 10/425; H01M 10/441
USPC ................................................... 320/134, 150
See application file for complete search history.

(56) References Cited

U.S. PATENT DOCUMENTS

| | | | |
|---|---|---|---|
| 5,371,453 A | 12/1994 | Fernandez | |
| 5,518,832 A | 5/1996 | Fernandez et al. | |

(Continued)

FOREIGN PATENT DOCUMENTS

| | | |
|---|---|---|
| EP | 0448767 | 10/1991 |
| EP | 0574753 | 12/1993 |

(Continued)

OTHER PUBLICATIONS

Microchip PIC16F616/16HV616 Datasheet, 2007, p. 1 available at http://ww1.microchip.com/downloads/en/DeviceDoc/41288C.pdf.

(Continued)

*Primary Examiner* — Daniel Miller
(74) *Attorney, Agent, or Firm* — Stephen R. Valancius (57) ABSTRACT

A battery pack can include a temperature sensor that can provide an output that is indicative of a temperature associated with the battery pack. A battery management unit can directly measure the temperature sensor when the battery pack is by itself or engaged with a tool. A charger can directly read the temperature sensor when the battery pack is engaged with the charger. Thus, the temperature sensor can be shared by the battery pack and the charger. The battery pack can utilize a same terminal that provides access to the temperature sensor to indicate a stop-charge signal. The charger can read the stop-charge signal on the same terminal used to directly access the temperature sensor.

5 Claims, 5 Drawing Sheets

(56) References Cited

U.S. PATENT DOCUMENTS

| | | |
|---|---|---|
| 5,582,928 A | 12/1996 | Farley |
| 5,608,304 A | 3/1997 | Okumura |
| 5,909,101 A | 6/1999 | Matsumoto et al. |
| 6,172,487 B1 | 1/2001 | Brotto |
| 6,819,083 B1 | 11/2004 | Patino et al. |
| 6,914,415 B2 | 7/2005 | Bohne et al. |
| 7,068,012 B1 | 6/2006 | Geren et al. |
| 7,068,013 B2 | 6/2006 | Patino et al. |
| 7,273,159 B2 | 9/2007 | Brotto |
| 2002/0195996 A1 | 12/2002 | Nakatsuji |
| 2005/0052159 A1 | 3/2005 | Moore et al. |
| 2006/0087286 A1 | 4/2006 | Phillips et al. |
| 2006/0152194 A1 | 7/2006 | Wang et al. |
| 2006/0197499 A1 | 9/2006 | Bucur et al. |
| 2007/0013341 A1 | 1/2007 | Hitomi et al. |
| 2007/0159135 A1 | 7/2007 | Teraoka |
| 2007/0164709 A1 | 7/2007 | Tsubaki et al. |
| 2007/0188135 A1 | 8/2007 | Odaohhara |
| 2007/0273328 A1 | 11/2007 | Nam et al. |
| 2008/0018304 A1 | 1/2008 | Litingtun et al. |

FOREIGN PATENT DOCUMENTS

| | | |
|---|---|---|
| EP | 0661769 | 7/1995 |
| EP | 0750385 | 12/1996 |
| EP | 0846362 | 6/1998 |
| EP | 1892791 | 2/2008 |
| WO | WO2005/038952 | 4/2005 |

OTHER PUBLICATIONS

Smart Battery Management Applications, Application Note Ac262, Actel Corporation, 2006.

SHARED CONTROL OF THERMISTOR AND DUAL PURPOSE THERMISTOR LINE

CROSS REFERENCE TO RELATED APPLICATIONS

This application is a continuation application of U.S. patent application Ser. No.12/246,844 filed Oct. 7, 2008.

FIELD

The present disclosure relates to rechargeable battery packs for power tools, and more specifically to shared control of the thermistor and dual purpose use of the thermistor line.

BACKGROUND

Rechargeable battery packs may provide a power source for cordless power tools. The battery pack may have a battery with a design voltage and may provide power to operate a power tool. The battery itself may consist of a number of individual battery cells that may be combined within the battery pack to provide a desired voltage. A lithium-ion battery may have a design voltage such as 18, 15, 12, or 9 volts, by way of non-limiting example. It may be desired to prevent charging and/or discharging of the cells in a lithium-ion battery when the temperature of the cells is above or below threshold values. The battery pack may contain a temperature sensor, such as a thermistor, to allow the temperature of the cells to be monitored. It may be desired to have the battery pack monitor its temperature with the thermistor when the battery pack is on a shelf or in a tool and to allow the charger to directly use the thermistor to monitor the temperature of the battery pack during charging.

The battery pack may undergo multiple charging operations at various charge current levels. To implement the charging at various charge current levels, a signal can be used to indicate when charging at one charge current level should cease. It may be desired to utilize a terminal on the battery pack to signal charge current reduction and/or termination to the charger while also utilizing this terminal to allow temperature measurement by the charger during the charging operation.

The statements in this section merely provide background information related to the present disclosure and may not constitute prior art.

SUMMARY

This section provides a general summary of the disclosure, and is not a comprehensive disclosure of its full scope or all of its features.

A rechargeable battery system according to the present disclosure includes a battery pack operable to deliver a discharge current and to receive a charge current and a charger operable to engage with the battery pack and supply a charge current to the battery pack. The battery pack can include at least one battery cell, a first pair of terminals, a temperature sensor extending between the terminals, and a battery management unit adapted to communicate with the temperature sensor. The battery management unit can also be operable to determine a temperature associated with the battery pack using the temperature sensor. The charger can include a power supply circuit, a second pair of terminals that engage with the first pair of terminals, and a charger control module adapted to communicate with the temperature sensor through at least one of the first pair of terminals. The charger control module can be operable to directly determine the temperature associated with the battery pack using the temperature sensor. The battery management unit determines the temperature associated with the battery pack using the temperature sensor when the battery pack is disengaged from the charger. The charger control module determines the temperature associated with the battery pack using the temperature sensor when the battery pack is engaged with the charger. This arrangement advantageously allows the temperature sensor in the battery pack to be shared by both the battery management unit in the battery pack and by the charger control module in the charger. The sharing does not occur at the same time and, rather, the control of the temperature sensor is switched between the battery management unit and the charger control module.

A battery charger operable to charge a battery pack having at least one battery cell and a temperature sensor operable to indicate a temperature associated with the battery pack can include a power supply circuit operable to supply a charge current. The charger can also include a charger control module adapted to communicate with the battery pack through a first terminal on the battery pack. The charger control module is operable to directly determine the temperature associated with the battery pack using the temperature sensor during a charging operation through the first terminal. The charger control module is also operable to determine a charge termination signal from the battery pack through the first terminal. Thus, the charger can use the same first terminal to both directly determine the temperature associated with the battery pack using the temperature sensor and also to determine a charge termination signal from the battery pack.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Corresponding reference numerals indicate corresponding parts throughout the several views of the drawings.

Figure 1:
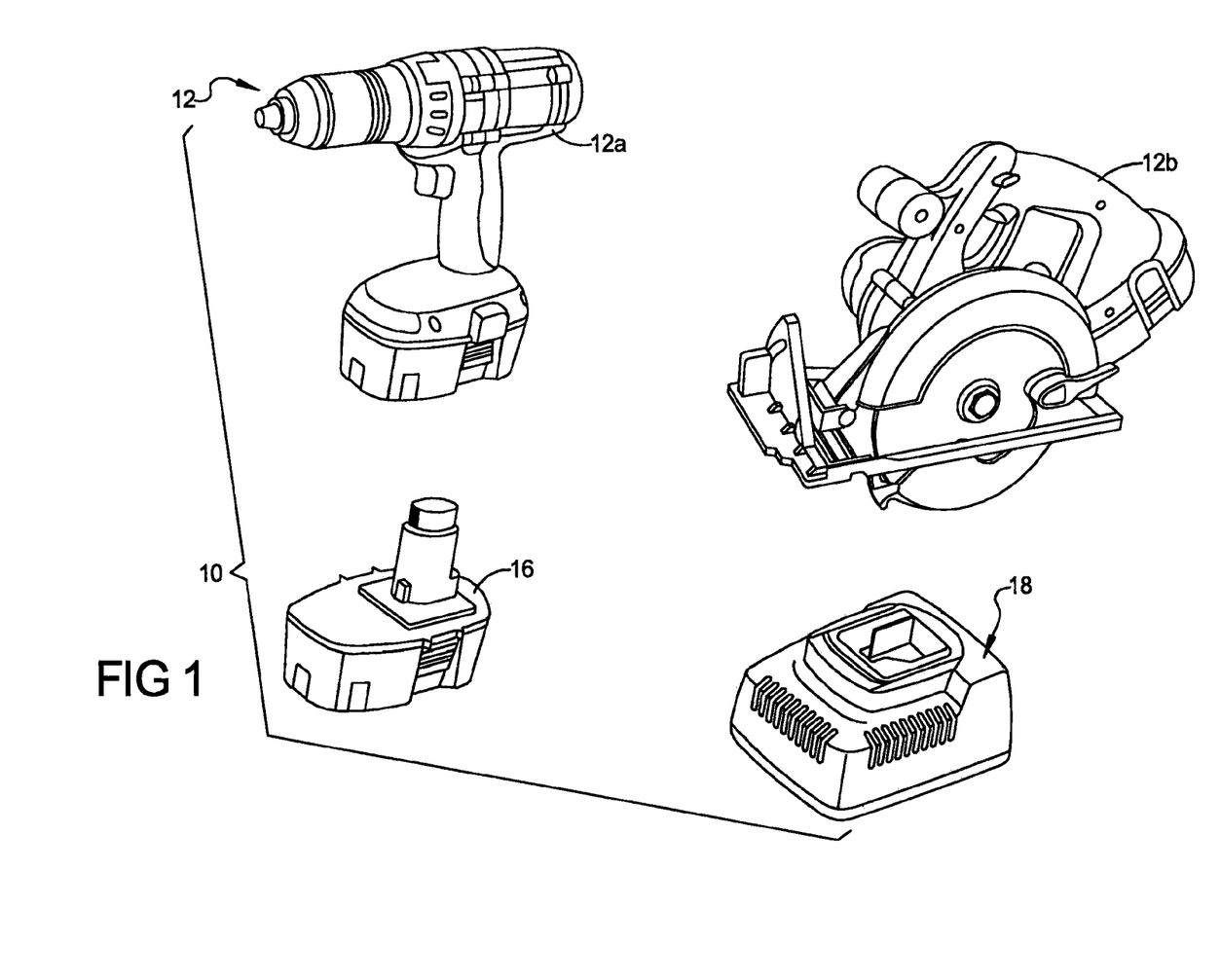
FIG. 1 is a drawing depicting a system of power tools, including a battery pack, power tools, and a charger.

The present disclosure can relate to a system of power tools of the type that is generally indicated by reference numeral 10 in FIG. 1. The system of power tools 10 can include, for example, one or more power tools 12, a battery pack 16, and a battery pack charger 18. Each of the power tools 12 can be any type of power tool, including without limitation drills, drill/drivers, hammer drill/drivers, rotary hammers, screwdrivers, impact drivers, circular saws, jigsaws, reciprocating saws, band saws, cutoff tools, cutout tools, shears, sanders, vacuums, lights, routers, adhesive dispensers, concrete vibrators, lasers, staplers, and nailers. In the particular example provided, system of power tools 10 includes a first power tool 12a and a second power tool 12b. For example, first power tool 12a can be a drill/driver similar to that which is described in U.S. Pat. No. 6,431,389, while second power tool 12b can be a circular saw similar to that which is described in U.S. Pat. No. 6,996,909. Battery pack 16 can be selectively removably coupled to first and second power tools 12a and 12b to provide electrical power thereto. Battery pack 16 can also be selectively electrically coupled to charger 18 to charge battery pack 16. It is noteworthy that the broader aspects of this disclosure are applicable to other types of battery-powered devices.

Figure 2:
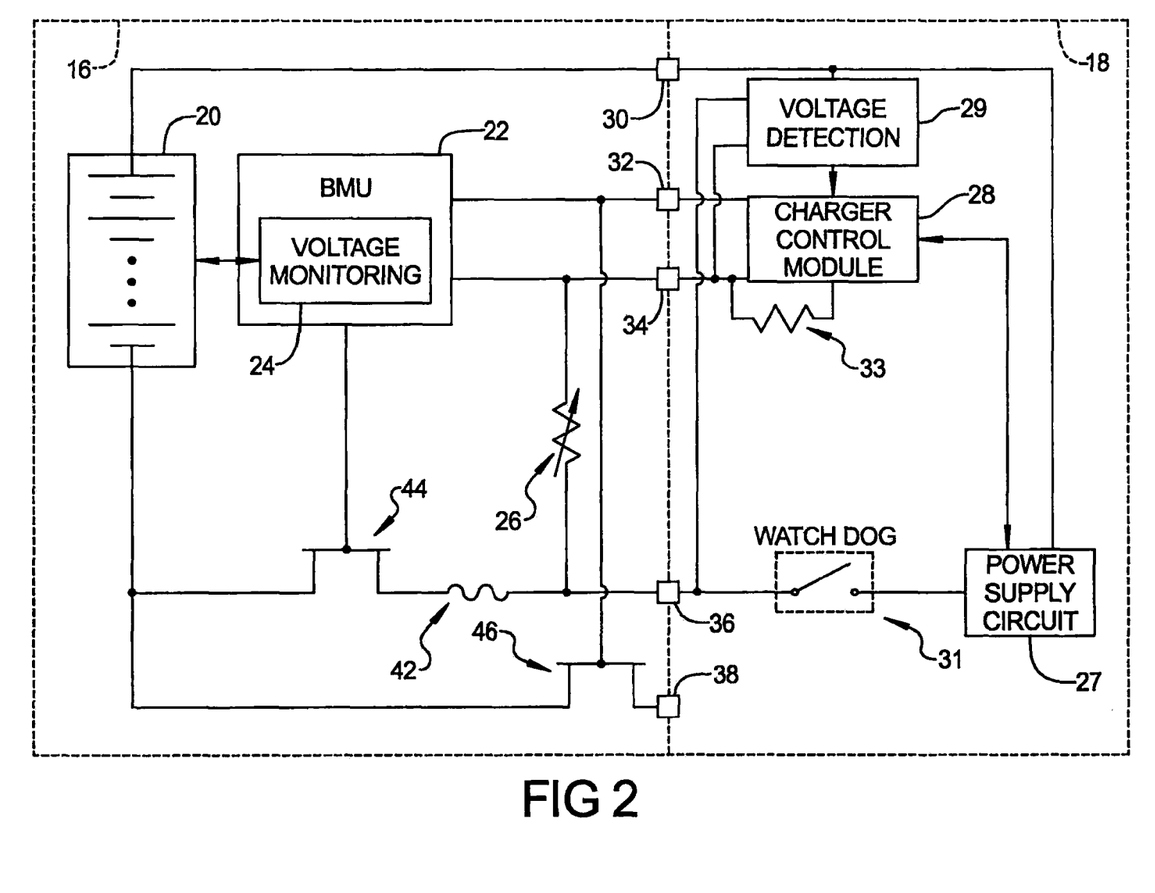
FIG. 2 is a block diagram of an exemplary configuration for a battery pack operably coupled to a battery charger.

FIG. 2 illustrates an exemplary configuration of a battery pack 16 operably coupled to charger 18. Battery pack 16 is generally comprised of a plurality of battery cells 20, a battery management unit (BMU) (also known as a battery control unit) 22, and various battery control circuits. However, the exemplary configuration is merely provided as a context for describing the various methods and circuits disclosed herein.

Battery pack 16 may include a plurality of battery cells 20 connected in series, and/or a plurality of serially connected strings of cells, in which the strings are in parallel with one another. For purposes of describing the exemplary embodiments, battery pack 16 may be composed of cells 20 having lithium-ion cell chemistry. In the context of cordless power tools, the nominal voltage rating of battery pack 16 is typically at least 18 volts. However, other voltage ratings are contemplated for different applications. In addition, battery pack 16 may be composed of cells of another lithium-based chemistry, such as lithium metal or lithium polymer, or other chemistry. Furthermore, battery packs 16 having cells that need temperature based control and/or over/under voltage control can also be used and may benefit from the teachings of the present disclosure. Although not limited hereto, battery pack 16 is preferably rechargeable.

BMU 22 is embedded within battery pack 16 and is responsible for protecting cells 20 and monitoring fault conditions which may develop. In an exemplary embodiment, BMU 22 is implemented in software on a digital microprocessor and can include additional analog battery monitoring ICs. However, BMU 22 may be embodied in hardware or software as a digital microcontroller, a microprocessor or an analog circuit, a digital signal processor, or by one or more digital ICs such as application specific integrated circuits (ASICs), for example. One suitable BMU 22 includes a Microchip PIC16F616 available from Microchip Technology Inc. and one or more ICs, such as Seiko S-8254 Series ICs available from Seiko Instruments, Inc. This BMU 22 is readily available and of a low cost. This BMU 22 can provide two separate and distinct signals indicative of the voltage of cells 20 relative to two thresholds without specifying the voltage of any particular cell 20. Other exemplary BMUs 22 can include two or more ICs, such as Seiko S-8204B Series ICs, which can be stacked together to get a higher voltage and which may preclude the need for a microprocessor. It should be appreciated that the teachings of the present disclosure can be utilized by battery packs that do not have a BMU as described herein by using custom circuits producing the same output although all of the advantages may not be realized.

BMU 22 can include a voltage monitoring circuit 24. In an exemplary embodiment, voltage monitoring circuit 24 is integral with BMU 22. In other embodiments, voltage monitoring circuit 24 can be separate from BMU 22. Voltage monitoring circuit 24 may be configured to sense individual cell voltage and sense total pack voltage of cells 20. Voltage monitoring circuit 24 provides a signal representing the individual cell and/or stack voltage that BMU 22 can utilize. Alternatively, BMU 22 may direct voltage monitoring circuit 24 to periodically measure cell voltage across each cell 20 of battery pack 16 and the total battery pack 16 voltage in a sequential manner. A current average cell voltage may be determined by dividing the measured total voltage of battery pack 16 by the number of cells 20 in battery pack 16. BMU 22 can output a simple two-state signal indicative of any cell 20 being at or above or below a low-voltage threshold, as described below. BMU 22 can also output a separate simple two-state signal indicative of any cell 20 being at or above or below a high-voltage threshold, as described below. The low and high-voltage thresholds can be set at the factory when manufacturing BMU 22.

A temperature sensor 26 may be configured to measure the temperature of cells 20. BMU 22 can include a pull-up resistor that can be selectively put in series with temperature sensor 26 and a voltage applied thereto. The voltage can be divided between the pull-up resistor and temperature sensor 26 such that the voltage of temperature sensor 26 is indicative of a temperature associated with battery pack 16 and can be determined by BMU 22. The pull-up resistor can be 10K by example. Temperature sensor 26 may be implemented with a negative temperature coefficient (NTC) thermistor, as shown, a positive temperature coefficient (PTC) thermistor, temperature sensing integrated circuits, or thermal couples by way of non-limiting example. BMU 22 normally (by default) provides high impedance, such as an open circuit by example, between temperature sensor 26 and BMU 22. BMU 22 can also provide a short, such as to ground or to the cathode (−polarity) of cells 20, across temperature sensor 26 by activating a switch, such as an FET by example.

Referring to FIG. 2, battery pack 16 is selectively coupled to charger 18. Charger 18 is generally comprised of a power supply circuit 27 and a charger control module 28. Charger 18 may include a terminal voltage detection circuit 29 and a watchdog circuit 31. It is envisioned that other sensing and/or protection circuits may also be incorporated into charger 18. However, this exemplary configuration is merely provided as a context for describing the various protection methods and circuits disclosed herein.

Charger control module 28 is responsible for charging cells 20 and monitoring any fault condition which may develop. Charger control module 28 can also take control of temperature sensor 26 and monitor the temperature of battery pack 16 when inserted in charger 18. Charger control module 28 can include a pull-up resistor 33 that can be selectively placed in series with temperature sensor 26 and a voltage applied thereto. Pull-up resistor 33 can be 10K by example. The voltage is divided between pull-up resistor 33 and temperature sensor 26 and can be determined by voltage detection circuit 29. The voltage of temperature sensor 26 is thereby indicative of a temperature associated with battery pack 16. The measuring of the temperature of battery pack 16 by charger 18 is described in more detail below. In an exemplary embodiment, charger control module 28 is implemented in software on a digital microcontroller. However, charger control module 28 may be embodied in hardware or software as a digital microcontroller, a microprocessor or an analog circuit, a digital signal processor or by one or more digital ICs such as application specific integrated circuits (ASICs), for example.

Battery pack 16 includes a plurality of terminals or pins 30, 32, 34, 36, 38 that are used either when engaged with charger 18 or with power tool 12. First terminal 30 is connected directly to the anode (+ polarity) of the most positive cell 20. First terminal 30 can thereby be in communication with the anode. First terminal 30 is utilized when battery pack 16 is in power tool 12 and when battery pack 16 is in charger 18. When engaged with power tool 12, first terminal 30 forms part of the discharge path. When battery pack 16 is engaged with charger 18, first terminal 30 forms part of the charge path and is engaged with power supply circuit 27.

Second terminal 32 is a data terminal that is utilized when battery pack 16 is engaged with charger 18 and is engaged with charger control module 28. Second terminal 32 is used by charger 18 to identify the type of cells 20 within battery pack 16 and to indicate a pre-charge condition (low-voltage condition) for battery pack 16. Second terminal 32 may also be used with power tool 12 to indicate a low-voltage condition which can trigger a stop to the discharge of cells 20.

Third terminal 34 is a data terminal that is only utilized when battery pack 16 is engaged with charger 18 and is engaged with charger control module 28. Third terminal 34 can be used by BMU 22 to signal charge step/termination (high-voltage condition) and can also be utilized by charger 18 to monitor the temperature of battery pack 16.

Fourth terminal 36 only makes contact in charger 18. Fourth terminal 36 is the main charge current path for battery pack 16 and engages with power supply circuit 27 of charger 18. Fourth terminal 36 also communicates with the cathode (− polarity) of cells 20. A fuse 42 can be disposed between fourth terminal 36 and the cathode of cells 20. Fuse 42 can rupture to prevent overcharging of battery pack 16. A switch 44 can be disposed between fourth terminal 36 and the cathode of cells 20. The switch 44 can be an FET and can be normally closed to complete circuit between the cathode of cells 20 and fourth terminal 36. BMU 22 can energize switch 44 to open the charge path and prevent charging of battery pack 16.

Fifth terminal 38 is only connected when battery pack 16 engages power tool 12. Fifth terminal 38 is connected directly to the cathode of cells 20 and functions as the main discharge current path for battery pack 16 in powering power tool 12. Fifth terminal 38 may be a shrouded female terminal to prevent accidental shorts. Battery pack 16 can include a switch 46 disposed between fifth terminal 38 and the cathode of cells 20. Switch 46 can be an FET and can be closed to complete circuit between the cathode of cells 20 and fifth terminal 38. When it is desired to open switch 46 to interrupt circuit between fifth terminal 38 and the cathode of cells 20, BMU 22 can apply a voltage thereto, such as through the line connected to the second terminal 32. It should be appreciated that in some embodiments, switch 46 can be disposed in power tool 12.

Figure 3:
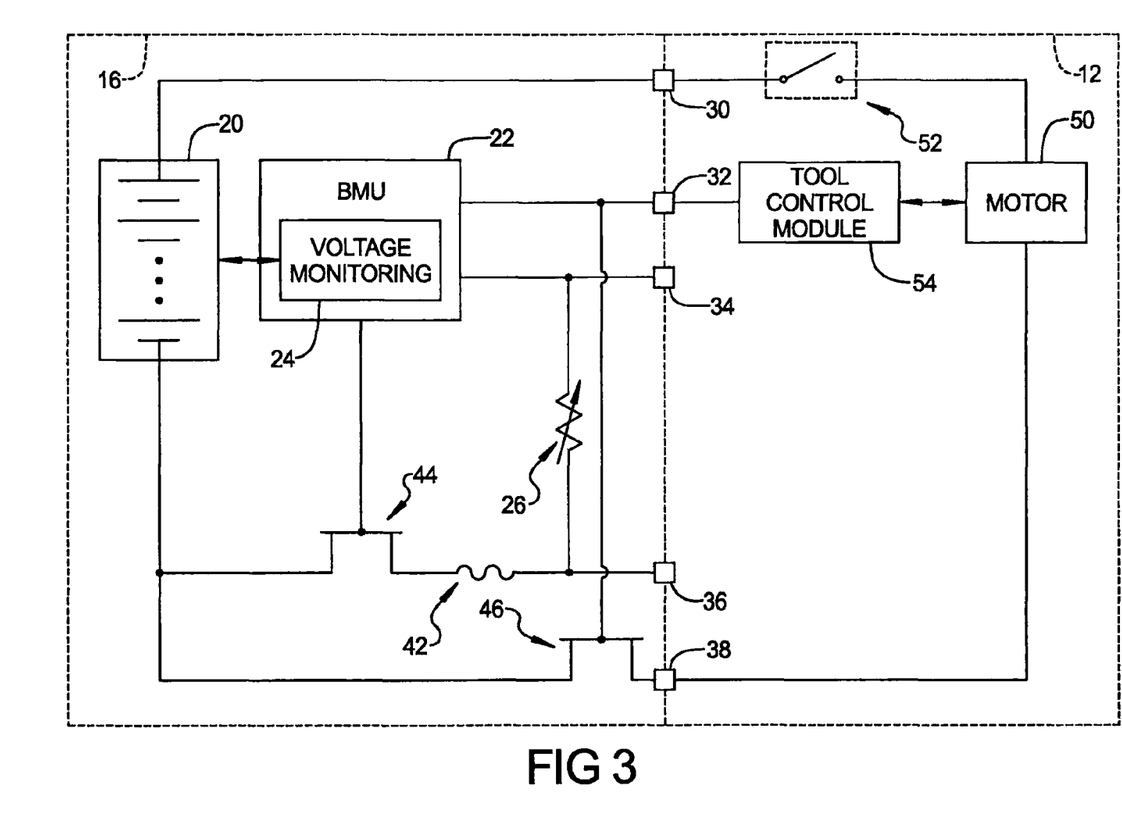
FIG. 3 is a block diagram of an exemplary configuration for a battery pack operably coupled to a power tool.

Referring now to FIG. 3, a block diagram of battery pack 16 operably coupled to power tool 12 is shown. Power tool 12 is generally comprised of a motor 50, an actuation mechanism 52 (such as a trigger assembly by example), and a tool control module 54. It is envisioned that other sensing and/or protection circuits may be incorporated into power tool 12. However, this exemplary configuration is merely provided as a context for describing the various protection methods and circuits disclosed herein.

Tool control module 54 is responsible for allowing motor 50 to drive power tool 12 along with monitoring fault conditions which may develop. In an exemplary embodiment, tool control module 54 is implemented in software on a digital microcontroller. However, tool control module 54 may be embodied in hardware or software as a digital microcontroller, a microprocessor or an analog circuit, a digital signal processor, or by one or more digital ICs such as application specific integrated circuits (ASICs), for example.

First terminal 30 of battery pack 16 communicates with actuation mechanism 52 which in turn communicates with motor 50. First terminal 30 forms part of the main discharge current path. Second terminal 32 provides data to tool control module 54. As stated above, BMU 22 can provide a varying signal at second terminal 32 based on the voltage of cells 20. For example, when any cell 20 is below the low-voltage threshold value, second terminal 32 can be open such that tool control module 54 sees a high impedance. This is also referred to as second terminal 32 being de-asserted. When the voltage of every cell 20 exceeds the low-voltage threshold value, BMU 22 can provide a voltage at second terminal 32 which can be detected by tool control module 54. This is also referred to as second terminal 32 being asserted. Tool control module 54 can prevent operation of motor 50 when second terminal 32 is asserted, thereby preventing discharge of cells 20 below the low-voltage threshold value. Additionally, when second terminal 32 is asserted, switch 46 can be energized, thereby disrupting the circuit between motor 50 and the cathode of cells 20. Switch 46 can thereby provide a second level of protection to avoid the discharge of cells 20 below the low-voltage threshold.

Third and fourth terminals 34, 36 are not utilized when battery pack 16 is engaged with power tool 12. Fifth terminal 38 communicates with motor 50 and forms part of the main discharge current path for battery pack 16.

Battery pack 16 and charger 18 according to the present disclosure share control of temperature sensor 26. In particular, when battery pack 16 is engaged with power tool 12 or not inserted in charger 18, such as when on a shelf, BMU 22 controls temperature sensor 26. In contrast, when battery pack 16 is engaged with charger 18, charger control module 28 controls temperature sensor 26 and is responsible for monitoring the temperature of battery pack 16 while engaged with charger 18, as described below.

Figure 4:
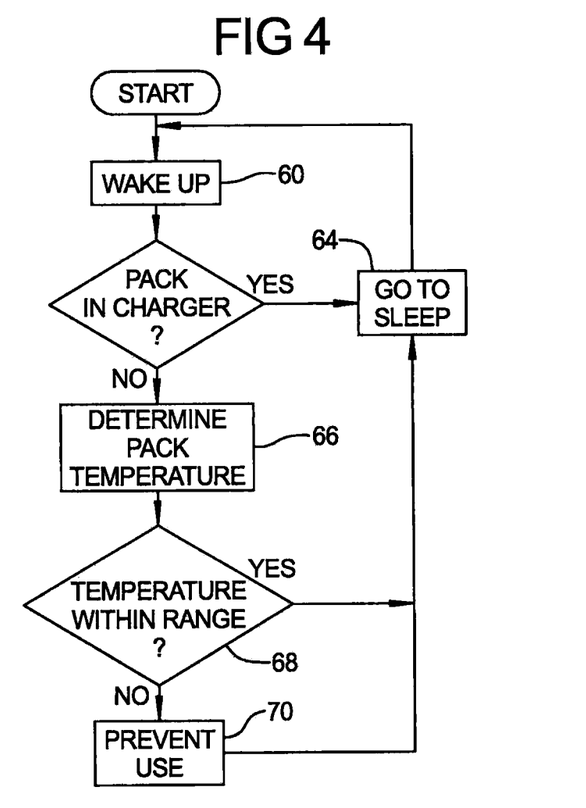
FIG. 4 is a flowchart illustrating the steps undertaken by the battery pack to determine its temperature and to release control of its thermistor.

Referring to FIG. 4, operation of BMU 22 and the management of battery pack 16 is shown. It should be appreciated that the description of the operation of BMU 22 discussed herein pertains to the monitoring of the temperature of battery pack 16 and, as such, it does not describe all the functionality of BMU 22. BMU 22 does not monitor the temperature of battery pack 16 continuously. Rather, BMU 22 periodically wakes up, such as every three seconds by example, as indicated in block 60, to check on the status of battery pack 16. When BMU 22 wakes up, BMU 22 ascertains if battery pack 16 is engaged with charger 18, as indicated in decision block 62. To ascertain if battery pack 16 is engaged with charger 18, BMU 22 looks at the voltage at third terminal 34. In particular, when battery pack 16 is either by itself or inserted in power tool 12, temperature sensor 26 should have a relatively low voltage or no voltage across it as no voltage is being applied to temperature sensor 26 through BMU 22 or through third terminal 34. Third terminal 34, as stated above, is only engaged when coupled to charger 18 and does not engage with power tool 12. However, when battery pack 16 is engaged with charger 18, charger control module 28 has a pull-up bias that raises the voltage at third terminal 34 up to a particular pull-up voltage level, such as the VCC voltage, which results in third terminal 34 having a relatively high voltage. The pull-up voltage level can be 3V by example. As such, BMU 22 can ascertain the voltage at third terminal 34 and determine whether battery pack 16 is engaged with charger 18 or not. BMU 22 may take multiple measures of the voltage at third terminal 34 to eliminate the effects of noise.

When BMU 22 determines that battery pack 16 is engaged with charger 18, BMU 22 goes to sleep, as indicated in block 64. BMU 22 will subsequently wake up, as indicated in block 60, at the prescribed periodic interval and again check to see if battery pack 16 is engaged with charger 18. This procedure continues until BMU 22 determines that battery pack 16 is not engaged with charger 18.

When BMU 22 determines that battery pack 16 is not engaged with charger 18, BMU 22 determines the temperature of battery pack 16, as indicated in block 66. To ascertain the temperature, BMU 22 engages the pull-up resistor and applies a voltage across both the pull-up resistor and temperature sensor 26, which are now in series with one another. BMU 22 ascertains the voltage drop across temperature sensor 26 which is directly related to the temperature of battery pack 16.

BMU 22 determines if the temperature is within an operating range, as indicated in decision block 68. If the temperature of battery pack 16 is within the operational range, BMU 22 goes to sleep, as indicated in block 64. BMU 22 subsequently wakes up as indicated in block 60 and begins the process all over again.

When BMU 22 determines that the temperature is not within the operational range, as determined in decision block 68, BMU 22 will prevent the use of battery pack 16, as indicated in block 70. BMU 22 can prevent operation of battery pack 16 such as by activating switches 44 and/or 46 which can prevent communication between fourth and fifth terminals 36, 38 and the cathode of cells 20, respectively. After preventing use of battery pack 16, BMU 22 goes to sleep, as indicated in block 64, and then periodically will wake up, as indicated in block 60. Upon waking up, BMU 22 again goes through the above described routine. After having previously prevented use of battery pack 16, if BMU 22 later determines that the temperature is within the operational range, BMU 22 can change the positions of switches 44 and/or 46, as needed, to again allow use of battery pack 16. It should be appreciated that when battery pack 16 is engaged with power tool 12, BMU 22 may continue to prevent use of battery pack 16 while actuation mechanism 52 of power tool 12 is engaged.

Figure 5:
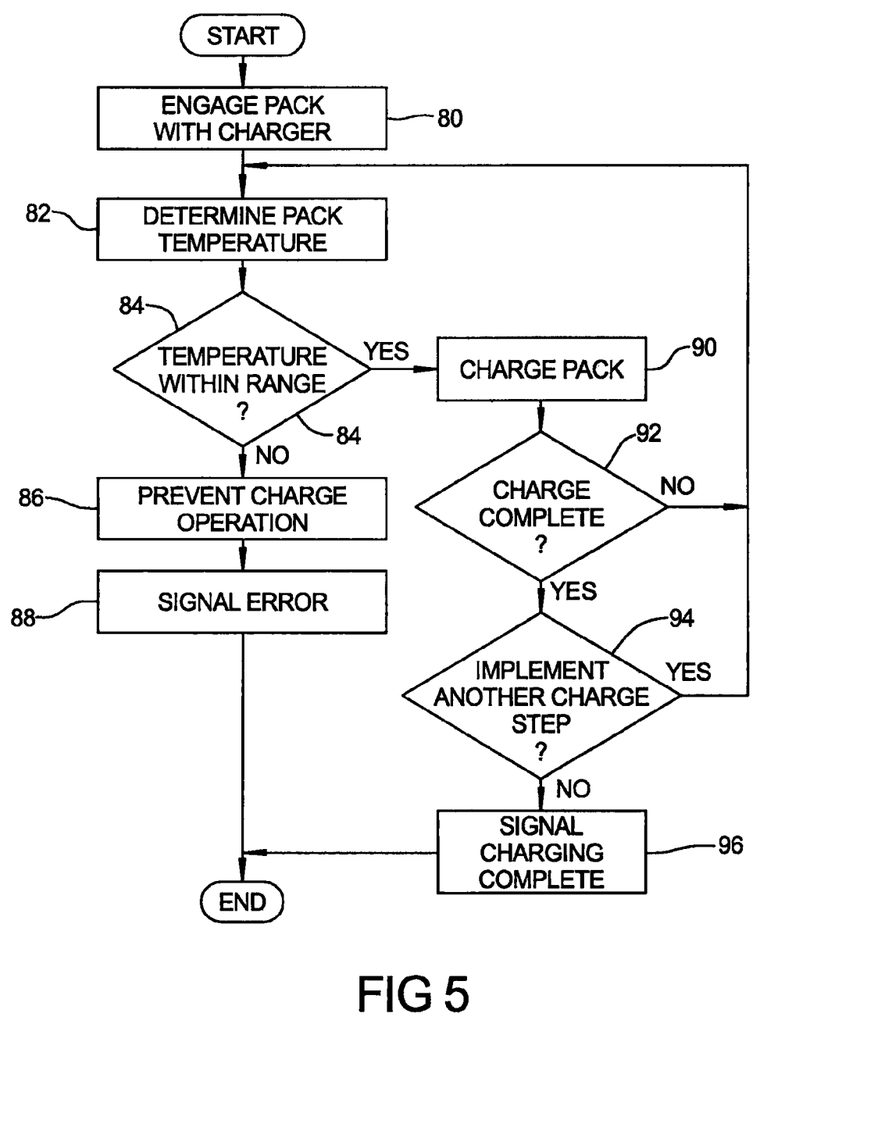
FIG. 5 is a flowchart illustrating the charging operation of the battery pack with the charger.

Referring now to FIG. 5, the process by which charger 18 takes control of temperature sensor 26 from battery pack 16 is shown. The process begins with battery pack 16 being engaged with charger 18, as indicated in block 80. When battery pack 16 is engaged with charger 18, charger control module 28 applies the pull-up voltage to pull-up resistor 33 which is then in series with temperature sensor 26 through third and fourth terminals 34, 36. BMU 22 normally (default) has a high impedance between third and fourth terminals 34, 36 such that charger control module 28 sees temperature sensor 26 between third and fourth terminals 34, 36. As a result of applying the pull-up voltage, charger control module 28 can then measure the voltage across temperature sensor 26 and determine the temperature of battery pack 16, as indicated in block 82. As stated above, whenever BMU 22 wakes up, BMU 22 will detect the high voltage at third terminal 34 provided by charger control module 28 and will go back to sleep, thereby maintaining the high impedance that allows charger control module 28 to see temperature sensor 26.

After charger 18 determines the temperature of battery pack 16, charger 18 determines if the temperature is within the operating range, as indicated in decision block 84. If the temperature is outside the operating range, charger control module 28 will prevent a charging operation, as indicated in block 86. To prevent a charging operation, charger control module 28 can activate watchdog circuit 31, thereby interrupting the connection between power supply circuit 27 and fourth terminal 36 of battery pack 16. Additionally, charger control module 28 can also command power supply circuit 27 to no longer supply charge current to battery pack 16.

After preventing the charging operation from occurring, charger control module 28 will signal an error, as indicated in block 88. The error can be a generic error that is signaled or can be more specific to the type of error encountered. For example, the error that is signaled can vary based upon the temperature of battery pack 16 being too high or too low. The charging process then ends.

If the temperature of battery pack 16 is determined to be within the operating range, as decided in decision block 84, charger control module 28 will implement a charging operation to charge battery pack 16, as indicated in block 90. During the charging operation, BMU 22 can monitor the voltage of cells 20 and provide a signal on second terminal 32 when the voltage of any particular cell is below or at or above a low-voltage threshold. For example, BMU 22 can provide a high impedance at second terminal 32 when any cell 20 is below the low-voltage threshold. When all cells 20 are at or above the low-voltage threshold, BMU 22 can apply a voltage to second terminal 32. Charger control module 28 can monitor second terminal 32 and implement either a pre-charge operation (relatively low-charge current level) or a fast-charge operation (relatively high-charge current level) to charge battery pack 16.

BMU 22 can also provide a signal at third terminal 34 that can function as a stop-charge signal. In particular, BMU 22 can monitor the voltage of cells 20 and when any particular cell 20 has a voltage that exceeds a high-voltage threshold, BMU 22 can pull third terminal 34 low (such as to ground or to fourth terminal 36 by example). When this occurs, charger control module 28 will no longer see temperature sensor 26 and, rather, will see the ground at third terminal 34. When this occurs, charger control module 28 can cease the charging operation, by commanding power supply circuit 27 to stop supplying the charge current and/or engaging watchdog circuit 31.

During the charging operation, charger control module 28 monitors the charging operation, such as by monitoring third terminal 34, and can ascertain if the charging operation is complete, as indicated in decision block 92. If the charging operation is not complete, charger control module 28 continues to determine the temperature of battery pack 16, as indicated in block 82, determine if the temperature is within the operation range, as indicated in block 84, and if so continues to charge battery pack 16 and determine if the charging operation is complete, as indicated in block 90 and decision block 92. This looping continues until either the temperature is not within range, as indicated in decision block 84, or charger control module 28 ascertains that the charging operation is complete, as indicated in decision block 92.

When charger control module 28 determines that the charging operation is complete, as determined in decision block 92, charger control module 28 next determines if it is desired to implement another charge step, as indicated in decision block 94. In particular, for some battery packs 16, it may be desired to provide differing charge current levels to charge cells 20 in a sequence. For example, it may be desired to initially charge cells 20 with a relatively high-charge current level until one of the cells 20 exceeds the high-voltage threshold. As the voltage of the cells drops to back below the high-voltage threshold, charger 18 may implement an intermediate charging operation wherein a relatively intermediate charge current is utilized to again charge cells 20 until one of cells 20 has a voltage that exceeds the high-voltage threshold. A third charging operation can utilize a relatively low-charge current to again charge cells 20 until one of cells 20 is above the high-voltage threshold. By way of example, a relatively high-charge current can be 2A, an intermediate-charge current can be 0.9A, and a relatively low-charge current can be 100 mA. In some embodiments, the charging operation may continue to charge cells 20 anytime the temperature of battery pack 16 is within the operating range and the voltage of cells 20 are below the high-voltage threshold.

Thus, when charger control module 28 ascertains that another charge step is to be implemented, as indicated in decision block 94, the operation returns to block 82 to determine the pack temperature and proceeds through the above-described process. It should be appreciated that charger control module 28 can keep track of the number of charging steps that are implemented and control the charging operation accordingly.

When it is determined that no more charge steps are to be implemented, as decided in decision block 94, charger control module 28 can signal that the charging is complete, as indicated in block 96. The charging process is then ended.

Figure 6:
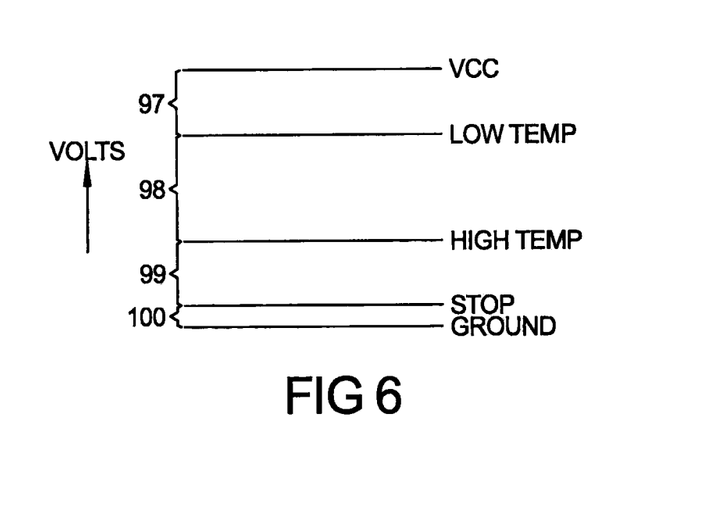
FIG. 6 is a representation of the voltage level at a terminal of the battery pack and the operating conditions associated with same.

Referring now to FIG. 6, a depiction of exemplary voltages that can be seen across temperature sensor 26 at third terminal 34 relative to the operating conditions is shown. The voltage at third terminal 34 can vary from ground (0V) to the pull-up voltage, such as the VCC voltage. The VCC voltage can be 3V by example. A voltage at third terminal 34 between VCC and the low temperature level is an area 97 where no charging or discharging can occur. Additionally, when this voltage is detected, the charger control module 28 can prevent charging and signal an error such as a bad pack or a low-temperature indicator. A voltage between the low-temperature level and the high-temperature level is an area 98 that is considered the normal operating range for both charging and operating battery pack 16. Voltage between the high-temperature level and the stop level is an area 99 wherein no charging or discharging should occur. Additionally, when this occurs, charger control module 28 can blink a bad pack or a high temp signal. There is a narrow band between the stop level and the ground level. This narrow band is an area 100 that allows for the stop level to account for noise that may be picked up at third terminal 34 and does not require a 0V signal to be present. When this is the case, battery pack 16 can signal to charger 18 to stop providing charge current if charger 18 is doing so.

Thus, in the present disclosure, battery pack 16 can utilize an internal temperature sensor 26 to monitor the temperature of battery pack 16. When the temperature is outside of an operational band, the battery pack 16 can prevent current flow through cells 20. Battery pack 16 utilizes temperature sensor 26 when battery pack 16 is engaged with power tool 12 or is by itself. When battery pack 16 is engaged with charger 18, however, BMU 22 relinquishes access to temperature sensor 26 to charger 18. Charger 18 can then read temperature sensor 26 directly and determine if conditions are appropriate for charging battery pack 16. Charger control module 28 can directly measure temperature sensor 26 to ascertain the temperature of battery pack 16. BMU 22 can provide a default high impedance between BMU 22 and temperature sensor 26 to allow charger control module 28 to directly read temperature sensor 26. BMU can also short (pull low, such as to ground) temperature sensor 26 to prevent direct access to temperature sensor 26 by charger control module 28. These two functions can both be accomplished utilizing third terminal 34. Thus, control of temperature sensor 26 is shared between both battery pack 16 and charger 18.

Furthermore, according to the present disclosure, third terminal 34 can also be used to signal a charge-current reduction and/or a termination to charger 18. In particular, as stated above, when the voltage of any cell 20 in battery pack 16 exceeds the high-voltage threshold, BMU 22 takes control of third terminal 34 and sends a signal to charger control module 28 that ceases the charging operation. For example, BMU 22 can short or pull low (such as to ground) third terminal 34 so that charger control module 28 no longer sees temperature sensor 26 and responds by either terminating the charging operation or implementing another charging step. In this way, third terminal 34 is used for two purposes: (1) temperature measurement by charger 18 during a charging operation; and (2) charge termination based on a signal from BMU 22.

The signals described above on third terminal 34 can both be analog in nature instead of digital. The analog nature of the signals makes the functionality of third terminal 34 consistent with commercially available, off-the-shelf, battery management IC's, such as those discussed above. By allowing charger 18 to directly measure temperature, BMUs 22 can be utilized that do not have temperature protection features. This can lower the cost or allow a wider range of BMUs to be utilized. By using the output of a standard BMU 22 to toggle third terminal 34, the system can be less expensive to build since it can use a standard part and a single terminal to accomplish both temperature and charge control.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A rechargeable battery system, comprising:
  a battery pack operable to deliver a discharge current and to receive a charge current from a charger, the battery pack including:
    at least one battery cell;
    a pair of pack terminals;
    a temperature sensor extending between the pack terminals;
    a battery management unit that measures voltage of the at least one battery cell and determines, using the temperature sensor, a temperature in the battery pack when the battery pack is disengaged from the charger, the battery management unit being electrically connected to a given node of the temperature sensor;
  a charger that selectively engages with the battery pack and operates to supply a charge current to the battery pack, the charger including:
    a power supply circuit;
    a charger terminal configured to engage with the pack terminal; and
    a charger control module electrically connected through the charger terminal to the given node of the temperature sensor when the charger is engaged with the battery pack and operable to determine the temperature in the battery pack from the temperature sensor;
  wherein the battery management unit is configured to periodically power up to determine whether the battery pack is engaged with the charger; power down when determined that the battery pack is engaged with the charger to create a high impedance at the given node of the temperature sensor; and communicate a signal to terminate charge current through the given node of the temperature sensor to the charger by pulling the given node of the temperature sensor to a low voltage when the measured voltage of the at least one battery cell in the battery pack exceeds a high voltage threshold.

2. The system of claim 1 wherein the battery management unit operates to prevent discharge of the battery cell while the temperature in the battery pack is outside an operational temperature range.

3. The system of claim 1 wherein the battery management unit relinquishes control of the temperature sensor to the charger when the battery pack is engaged with the charger.

4. The system of claim 1 wherein the temperature sensor is defined as a thermistor.

5. The system of claim 1 wherein the charger control module is selectively coupled via a resistor to the given node.

* * * * *